US011897074B2

(12) United States Patent
Song

(10) Patent No.: US 11,897,074 B2
(45) Date of Patent: Feb. 13, 2024

(54) NEEDLE ARRAYS FOR FORMING ULTRASONIC PERFORATIONS, AND METHODS OF MAKING THE SAME

(71) Applicant: The Boeing Company, Chicago, IL (US)

(72) Inventor: Weidong Song, Woodinville, WA (US)

(73) Assignee: The Boeing Company, Arlington, VA (US)

( * ) Notice: Subject to any disclaimer, the term of this patent is extended or adjusted under 35 U.S.C. 154(b) by 1030 days.

(21) Appl. No.: 16/796,658

(22) Filed: Feb. 20, 2020

(65) Prior Publication Data

US 2021/0260713 A1 Aug. 26, 2021

(51) Int. Cl.
*B24B 1/04* (2006.01)
*B26F 1/24* (2006.01)

(52) U.S. Cl.
CPC . *B24B 1/04* (2013.01); *B26F 1/24* (2013.01)

(58) Field of Classification Search
CPC .................................... B24B 1/04; B26F 1/24
USPC ............................................................. 83/30
See application file for complete search history.

(56) References Cited

U.S. PATENT DOCUMENTS 4,747,895 A * 5/1988 Wallerstein ............ B26D 7/086 156/580.2
5,207,956 A 5/1993 Kline et al.
5,648,107 A * 7/1997 Kagawa ................ B29C 59/022 264/293
6,190,602 B1 * 2/2001 Blaney .................. B29C 70/545 156/303.1
8,834,668 B2 9/2014 Nelson et al.
2011/0162495 A1 * 7/2011 Sugiyama ................. B26F 1/24 83/13

(Continued)

FOREIGN PATENT DOCUMENTS

CN 104837605 8/2015
CN 105936131 9/2016

(Continued)

OTHER PUBLICATIONS

European Patent Office, Extended European Search Report for related European patent application EP 21 15 7903, dated Jul. 7, 2021.

(Continued)

*Primary Examiner* — Omar Flores Sanchez
(74) *Attorney, Agent, or Firm* — Kolitch Romano Dascenzo Gates LLC

(57) ABSTRACT

Needle arrays for forming ultrasonic perforations may be formed from additive manufacturing and with non-circular cross-sectional areas for forming a plurality of holes, or perforations, in a thin sheet material. Methods of forming a plurality of perforations in a thin sheet of a composite material may include positioning the thin sheet under the needle array, repeatedly contacting the surface of the thin sheet to form perforations therein, translating the thin sheet and/or the needle array such that a different area of the thin sheet is positioned under the needle array, and again repeatedly contacting the surface of the thin sheet to form the perforations therein. Related systems may include an ultrasonic actuator, a needle array, and a remote heating unit configured to heat the workpiece while the perforations are formed therein.

20 Claims, 10 Drawing Sheets

(56) References Cited

U.S. PATENT DOCUMENTS

| | | | | |
|---|---|---|---|---|
| 2012/0283348 | A1 | 11/2012 | Akita et al. | |
| 2014/0302446 | A1 | 10/2014 | Anderson et al. | |
| 2014/0318693 | A1 | 10/2014 | Nelson et al. | |
| 2016/0214328 | A1 | 7/2016 | MacAdams et al. | |
| 2019/0030308 | A1 * | 1/2019 | Niitsu | B26F 1/24 |
| 2019/0030858 | A1 * | 1/2019 | Kameda | B32B 7/08 |
| 2019/0389167 | A1 * | 12/2019 | Marcus | B31B 50/20 |
| 2020/0024782 | A1 * | 1/2020 | Takaki | D05B 37/02 |
| 2021/0260712 | A1 * | 8/2021 | Song | B26D 7/086 |
| 2022/0152861 | A1 * | 5/2022 | Johannison | B32B 27/36 |
| 2023/0033918 | A1 * | 2/2023 | Xia | C01B 32/225 |

FOREIGN PATENT DOCUMENTS

| | | |
|---|---|---|
| EP | 1151850 | 7/2001 |
| EP | 1547753 | 6/2005 |
| EP | 2055464 | 5/2009 |
| EP | 2842672 | 3/2015 |
| EP | 3088152 | 11/2016 |
| FR | 2675711 | 10/1992 |
| JP | 6356975 | 7/2018 |
| JP | WO 2019/203074 | 10/2019 |

OTHER PUBLICATIONS

Machine-generated English translation of the abstract of JP 63 53975 B2, downloaded from Espacenet.com on Aug. 23, 2021.

Machine-generated English translation of the abstract of WO 2019/203074A1, downloaded from Espacenet.com on Aug. 23, 2021.

Machine generated English language translation for CN104837605, published Aug. 12, 2015.

Machine generated English language translation for CN105936131, published Sep. 14, 2016.

Machine generated English language translation of abstract for FR2675711, published Oct. 30, 1992.

* cited by examiner

NEEDLE ARRAYS FOR FORMING ULTRASONIC PERFORATIONS, AND METHODS OF MAKING THE SAME

FIELD

The present disclosure relates generally to needle arrays and more particularly to needle arrays for forming ultrasonic perforations, and methods of making the same.

BACKGROUND

Acoustic liners are often formed using thin materials with many small holes, or perforations, formed therein. For example, acoustic liners may be placed inside jet engines (e.g., in an engine inlet inner barrel) for noise attenuation (i.e. to dampen engine noise and/or reduce noise pollution on aircraft). These acoustic liners are often formed by placing a perforated sheet of material (e.g., metal or graphite sheets) over a honeycomb core material, which is often sandwiched between the perforated sheet and an impervious layer, or backplate.

The perforated sheets are formed by punching or drilling hundreds of thousands, or even a million or more, small holes through thin metal or composite material sheets. Conventional methods involve drilling these holes one at a time, which is time- and capital-intensive, and therefore expensive from a build cycle standpoint. In some cases, such drilling may take over a week of robotic drilling operations, with each individual hole taking anywhere from one to five seconds to drill. In addition, tooling costs for forming such perforations is expensive in terms of wear on drill bits that requires frequent replacement, especially in the case of drilling in composite materials (e.g., carbon fiber or glass fiber reinforced polymers) and/or other thermoplastic materials. Additionally, drill bits often need to be made from expensive materials such as tool steel that are difficult to machine. Attempts have been made to drill multiple holes at once, though such attempts have been limited to drilling 4-12 holes at once due to the rotational movement requirement by such drilling operations.

Ultrasonic drilling is a technique that uses high frequency, low amplitude vibrations of a tool, or bit, against a workpiece surface to remove material from the workpiece by micro-chipping or erosion with abrasive particles. As opposed to traditional drilling methods, which use rotation to cut through materials, ultrasonic drilling relies on axial vibrations to essentially hammer the bit into the material. An example of a prior art ultrasonic drilling machine 10 is illustrated in FIG. 1. Ultrasonic drilling machine 10 includes a piezoelectric actuator 12 as its source of power, and utilizes a variety of horns 14 to vibrate a bit through workpiece 16 in the presence of fine abrasive particles. The fine abrasive particles are mixed with water to form a slurry stored in a slurry tank 18. A slurry pump 20 distributes the slurry across workpiece 16 and the tip of the bit via a line and nozzle 22, which is needed to remove material from workpiece 16 while keeping the bit clean and effective. The slurry also serves as a coolant to keep the material and bit cool so as to prevent damage to the workpiece and bit. The slurry is returned to slurry tank 18 via slurry return line 24, which serves to carry debris away from the cutting area. The ability of the slurry, or cutting fluid, to reach the bit limits the depth to which ultrasonic drilling machines may be used because ultrasonic drilling bits do not include slots to allow access of the slurry like those used with rotational drills.

Hard and/or brittle materials have successfully been machined using ultrasonic drilling, such as semi-conductors, stainless steel, glass, ceramics, carbide, quartz, stones, tungsten, granite, rock, as well as delicate bones for medical applications. Attempts to utilize ultrasonic drilling methods with composite materials (e.g., carbon fiber reinforced plastics) have been limited to applying ultrasonic vibrations to rotary drill bits, which must be cooled using a slurry or other cooling fluids during drilling. Furthermore, drilling through composite materials tends to be difficult to do, costly, and often results in damage to the composite part.

SUMMARY

A needle array for forming ultrasonic perforations in a workpiece includes a plurality of needles arranged to form the needle array and a support plate. Each needle of the plurality of needles is oriented to extend along a longitudinal axis from a first end to a second end, wherein each respective needle of the plurality of needles is configured to form a respective hole in the workpiece when the needle array is vibrated along the longitudinal axis at an ultrasonic operating frequency while the needle array is positioned to repeatedly contact a surface of the workpiece. Each needle has a circular or non-circular cross-sectional area. The needle array is configured to form a plurality of holes within a region of the workpiece without translating the needle array with respect to the workpiece, without rotating the plurality of needles about the longitudinal axis, and without rotating the plurality of needles with respect to the workpiece. Each respective needle of the plurality of needles is coupled to the support plate at its respective first end, and the needle array is configured to be operatively coupled to an ultrasonic actuator, via the support plate, to vibrate the needle array at the ultrasonic operating frequency.

A method of making a needle array for forming ultrasonic perforations may include additively manufacturing a plurality of needles via 3D printing and additively manufacturing a support plate configured to secure a respective position of each respective needle with respect to the other needles of the plurality of needles such that the plurality of needles defines the needle array. The support plate and the first ends of the plurality of needles are typically integrally formed, in such methods. The plurality of needles extend away from the support plate such that the tips of the plurality of needles are spaced apart from the support plate.

In other methods of making a needle array for forming ultrasonic perforations, a plurality of needles is coupled to a support plate, with each respective needle of the plurality of needles extending longitudinally from a respective first end to a respective tip. Again, the plurality of needles are configured to repeatedly contact a workpiece at an ultrasonic operating frequency such that each respective needle of the needle array forms a respective hole through the workpiece, and the support plate is configured to couple the plurality of needles together and secure a respective position of each respective needle with respect to the other needles of the plurality of needles such that the plurality of needles defines the needle array. The first ends of the plurality of needles are coupled to the support plate in the coupling the plurality of needles, and the plurality of needles extend away from the support plate such that the tips of the plurality of needles are spaced apart from the support plate. Such methods also include selecting a respective length of each respective needle of the plurality of needles to define a desired contact shape, contact contour, or contact plane collectively defined by the tips of the needles, and arranging each respective needle with respect to one another in a desired distribution pattern, based on their respective lengths, to form the needle array.

Disclosed methods of forming a plurality of perforations in a thin sheet of a composite material may include positioning a surface of the thin sheet with respect to a needle array operatively coupled to an ultrasonic drilling apparatus, such that the needle array is positioned above a first region of the thin sheet, and repeatedly contacting the surface of the thin sheet within the first region with the needle array at an operating frequency of above 20 kHz for a period of time sufficient to form a first plurality of holes in the first region of the thin sheet. The repeatedly contacting the surface of the thin sheet forms a respective hole in the thin sheet corresponding to each respective needle of the needle array, and the repeatedly contacting the surface of the thin sheet is performed without rotating the plurality of needles about the longitudinal axis, without rotating the needles with respect to the thin sheet, and without use of a slurry or a cooling fluid. Methods also may include translating the needle array such that the needle array is positioned above a second region of the thin sheet, and again repeatedly contacting the surface of the thin sheet within the second region with the needle array at an operating frequency of above 20 kHz for a period of time sufficient to form a second plurality of holes in the second region of the thin sheet, wherein the repeatedly contacting the surface of the thin sheet forms a respective hole in the thin sheet corresponding to each respective needle of the needle array.

Disclosed systems for forming perforations in a thin sheet of a composite material include an ultrasonic drilling apparatus and a remote heating unit spaced apart from the ultrasonic drilling apparatus. The ultrasonic drilling apparatus includes a needle array and an ultrasonic actuator configured to vibrate the needle array along a longitudinal axis such that the needle array repeatedly contacts a surface of the thin sheet at an operating frequency sufficient to form a plurality of holes through the thin sheet within a first region of the thin sheet. Again, the needle array does not rotate with respect to the surface of the thin sheet while the plurality of holes is formed in such systems, and the ultrasonic drilling apparatus is configured to operate without use of a slurry or a cooling fluid. The remote heating unit is configured to locally heat the first region of the thin sheet while the plurality of holes is formed by the ultrasonic drilling apparatus.

DESCRIPTION

Figure 1:
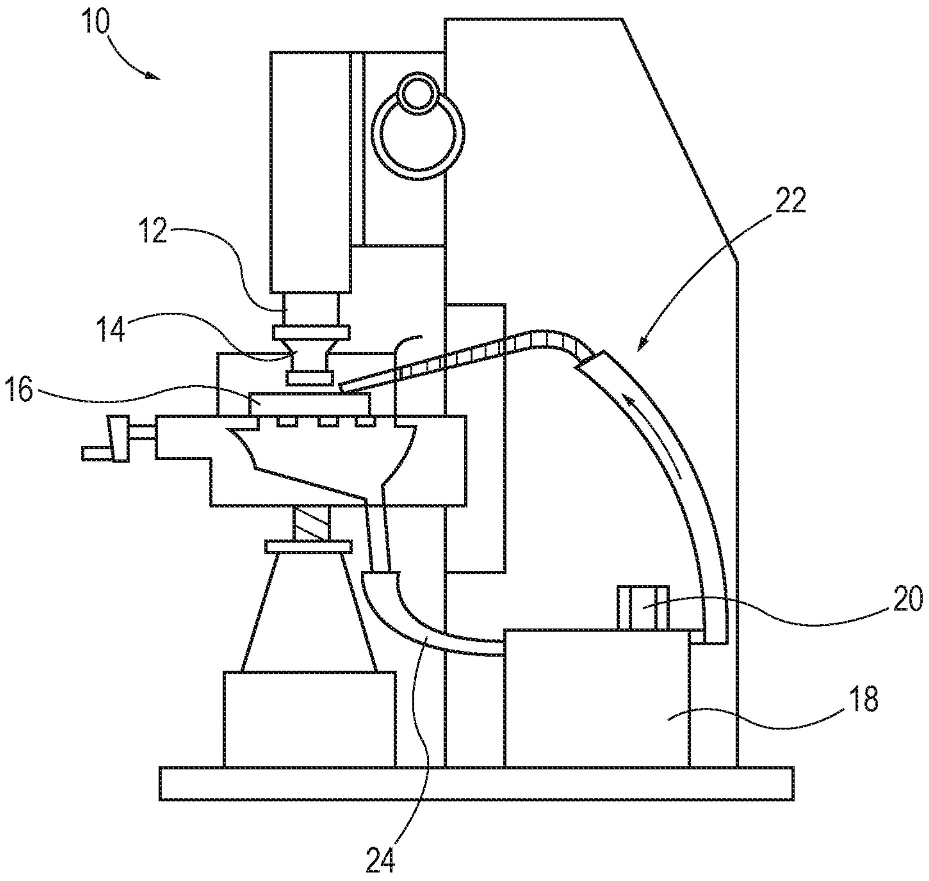
FIG. 1 (PRIOR ART)
FIG. 1 is an elevation view of a prior art ultrasonic drilling apparatus.
Figure 2:
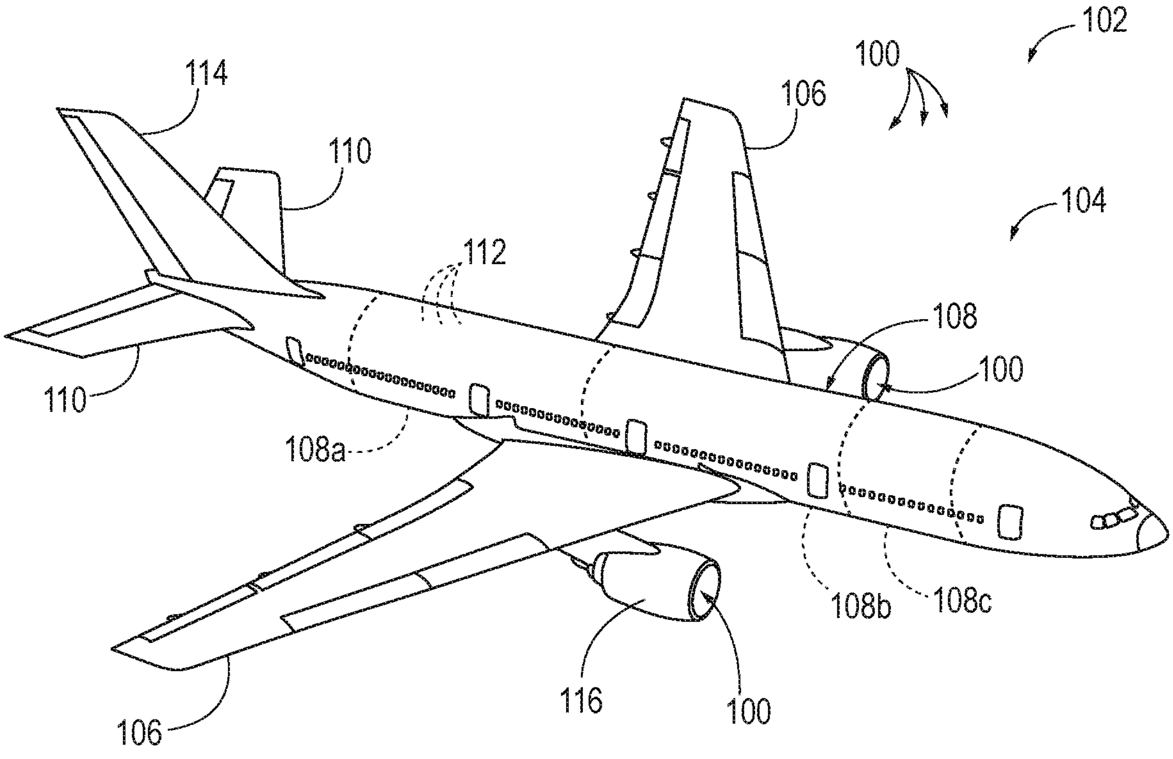
FIG. 2 is a schematic representation of an apparatus that may include one or more acoustic liners according to the present disclosure, and/or one or more acoustic liners formed according to methods of the present disclosure.

With reference to FIG. 2, one or more perforated sheets 100 may be included in an apparatus 102. Perforated sheets 100 may be utilized in many different industries and applications, such as aerospace, automotive, electronic, construction, military, recreation, and/or motorsport industries. In FIG. 2, an example of apparatus 102 that may include one or more perforated sheets 100 generally is illustrated in the form of an aircraft 104. Aircraft 104 may take any suitable form, including commercial aircraft, military aircraft, or any other suitable aircraft. While FIG. 2 illustrates aircraft 104 in the form of a fixed wing aircraft, other types and configurations of aircraft are within the scope of aircraft 104 according to the present disclosure, including (but not limited to) rotorcraft and helicopters.

Apparatus 102 (e.g., aircraft 104) may include one or more perforated sheets 100. As illustrative, non-exclusive examples, perforated sheets 100 may be utilized in engine housings 116, though other components of aircraft 104, such as wings 106, fuselages 108 or fuselage sections **108*a*, 108*b*, 108*c*, horizontal stabilizers 110, overhead storage bins 112, vertical stabilizers 114, and others additionally or alternatively may include one or more perforated sheets 100. Other applications in aircraft 104 for perforated sheets 100 may include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 102 (including one or more perforated sheets 100**) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

FIGS. 3-9 and 13-14 provide illustrative, non-exclusive examples of systems 30, acoustic liners 33, needles 36, and/or needle arrays 60 according to the present disclosure. Elements that serve a similar, or at least substantially similar, purpose are labeled with like numbers in each of FIGS. 3-9 and 13-14 (and throughout the specification in general), and these elements may not be discussed in detail herein with reference to each of FIGS. 3-9 and 13-14. Similarly, all elements may not be labeled in each of FIGS. 3-9 and 13-14, but reference numerals associated therewith may be utilized herein for consistency. Elements, components, and/or features that are discussed herein with reference to one or more of FIGS. 3-9 and 13-14 may be included in and/or utilized with any of FIGS. 3-9 and 13-14 without departing from the scope of the present disclosure. In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure. Where appropriate, the reference numerals from each of FIGS. 3-9 and 13-14 are used to designate corresponding parts of others of FIGS. 3-9 and 13-14 however, the examples of FIGS. 3-9 and 13-14 are non-exclusive and may incorporate any number of the various aspects, configurations, characteristics, properties, etc. that are illustrated in and discussed with reference to others of FIGS. 3-9 and 13-14 as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 3-9 and 13-14; however, it is within the scope of the present disclosure that the previously discussed features, variants, etc. may be utilized with any of the same.

Figure 3:
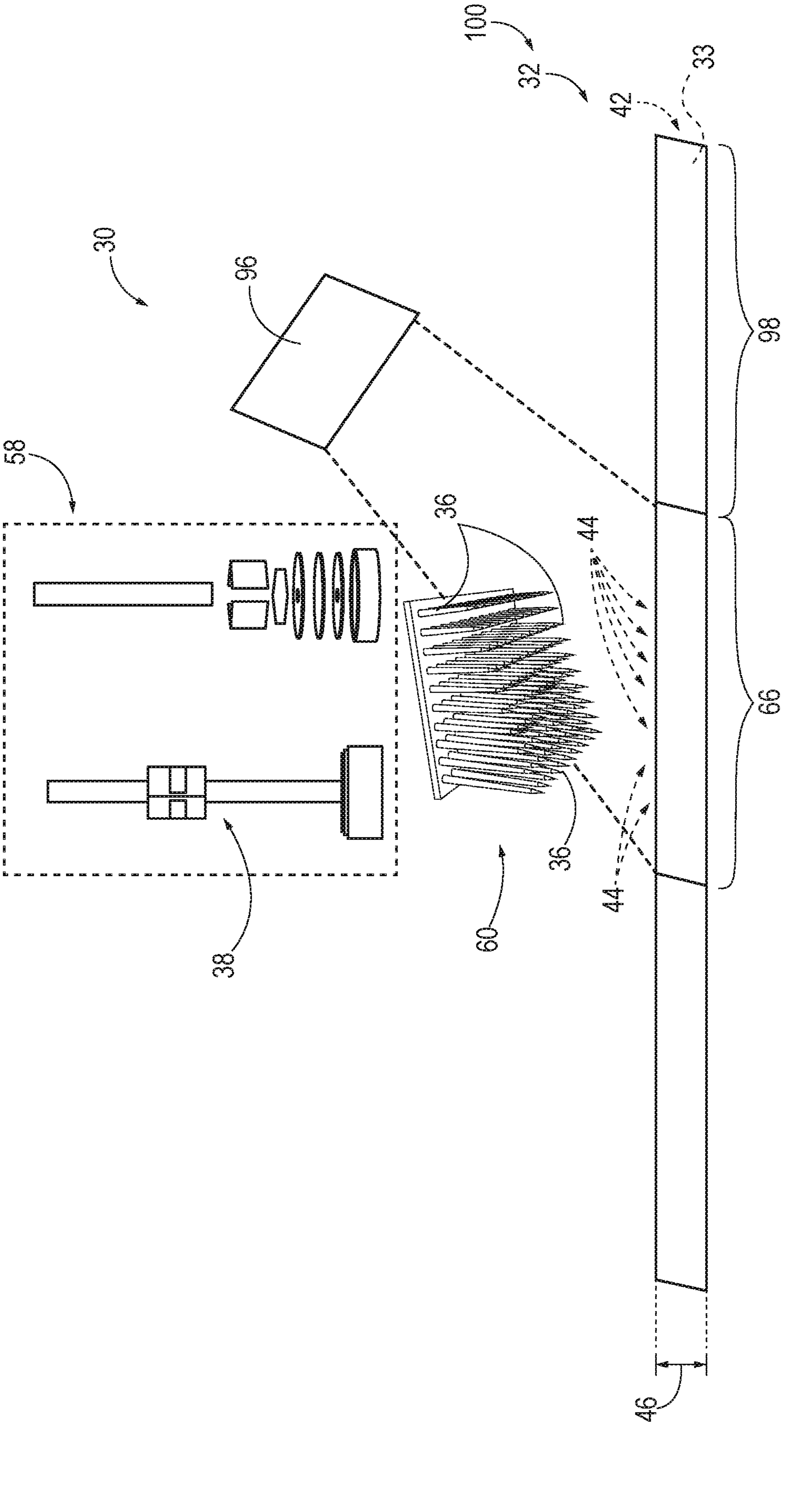
FIG. 3 is a schematic representation of examples of systems for performing ultrasonic drilling methods according to the present disclosure.

FIG. 3 schematically illustrates systems 30 according to the present disclosure. Such systems 30 may be used to form one or more holes in a workpiece 32 (which is an example of perforated sheet 100). In some examples, systems 30 may be used to perforate workpiece 32 and/or to form some or all of an acoustic liner 33 (which may be an example of workpiece 32). According to the present disclosure, and as will be described in more detail herein, one or more holes may be formed in (e.g., through) workpiece 32 by repeatedly contacting a surface 34 of workpiece 32 with one or more needles 36 (which may be arranged as a needle array 60) operatively coupled to an ultrasonic actuator 38 configured to vibrate the one or more needles 36 along a longitudinal axis 40 at an ultrasonic operating frequency and amplitude for a time sufficient to form one or more holes in workpiece 32. The combination of ultrasonic actuator 38 and needle 36 (or needle array 60) may be referred to herein as an ultrasonic drilling apparatus 58. In some examples, ultrasonic drilling apparatus 58 includes a horn coupling needle array 60 to ultrasonic actuator 38, with said horn being configured to amplify the vibrations along longitudinal axis 40.

Figure 6:
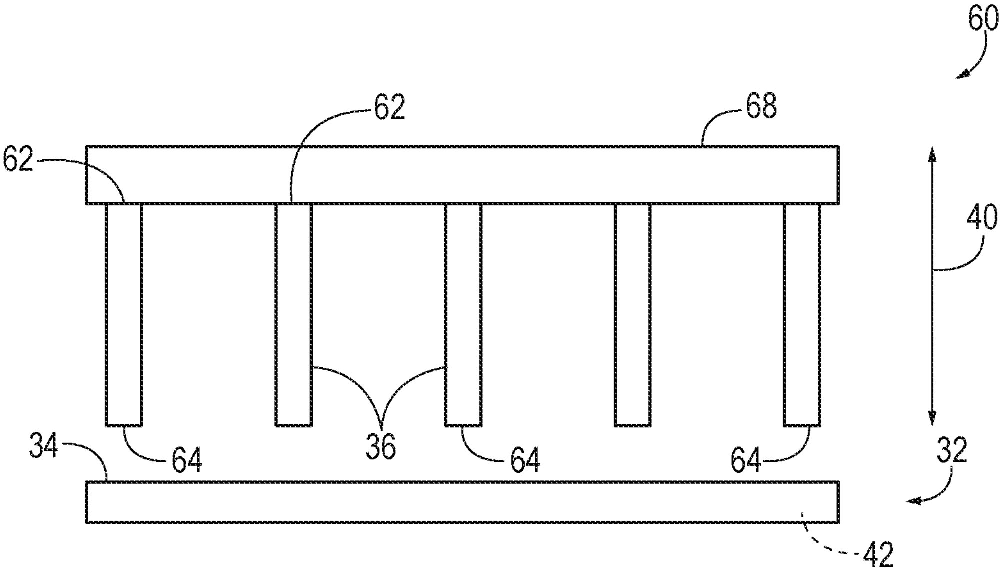
FIG. 6 is a schematic representation of examples of needle arrays according to the present disclosure, from a side elevation view.

Generally, systems 30 are configured to form a respective hole through workpiece 32 for each respective needle 36 operatively coupled to ultrasonic actuator 38. Ultrasonic actuator 38 is configured to oscillate needle 36 (or needle array 60) at an ultrasonic frequency, such as via a piezoelectric transducer and electric oscillator. In various examples, ultrasonic actuator 38 may include a mechanical, electromagnetic, and/or thermal energy source. To form one or more holes in different regions, or areas, of workpiece 32, workpiece 32 may be translated with respect to needle 36, and/or needle 36 may be translated with respect to workpiece 32, such that needle 36 is positioned above a different region, or area, of workpiece 32. Needle 36 may then be brought to contact surface 34 repeatedly in said different area of workpiece 32 in order to form one or more additional holes in workpiece 32. Needle 36 (e.g., longitudinal axis 40 of needle 36 or of needles 36 of needle array 60) may be arranged such that it is at least substantially orthogonal to surface 34 (e.g., as shown in FIG. 6). In other examples, needle 36 may contact surface 34 at a non-orthogonal angle to surface 34.

Systems 30 are configured to form perforations 44 through workpiece 32 in a manner different than conventional drilling. Rather than rotating a drill bit at high speeds to cut through material (as is done with conventional drilling), needle 36 is not rotated with respect to surface 34 of workpiece 32 (nor is workpiece 32 rotated with respect to needle 36) during formation of perforations 44. Similarly, needle array 60 is not rotated with respect to surface 34 of workpiece 32 (nor is workpiece 32 rotated with respect to needle array 60) during formation of perforations 44. Furthermore, conventional drilling requires the use of a cooling fluid to prevent damage to the drill bits and parts due to the heat produced during rotational drilling, and conventional ultrasonic drilling that still involves rotation of drill bits requires the use of a slurry to cool the part and/or carry away debris. On the other hand, presently disclosed ultrasonic drilling apparatus 58 is configured to operate without use of a slurry or a cooling fluid (though either or both may optionally be used, if desired).

Figure 4:
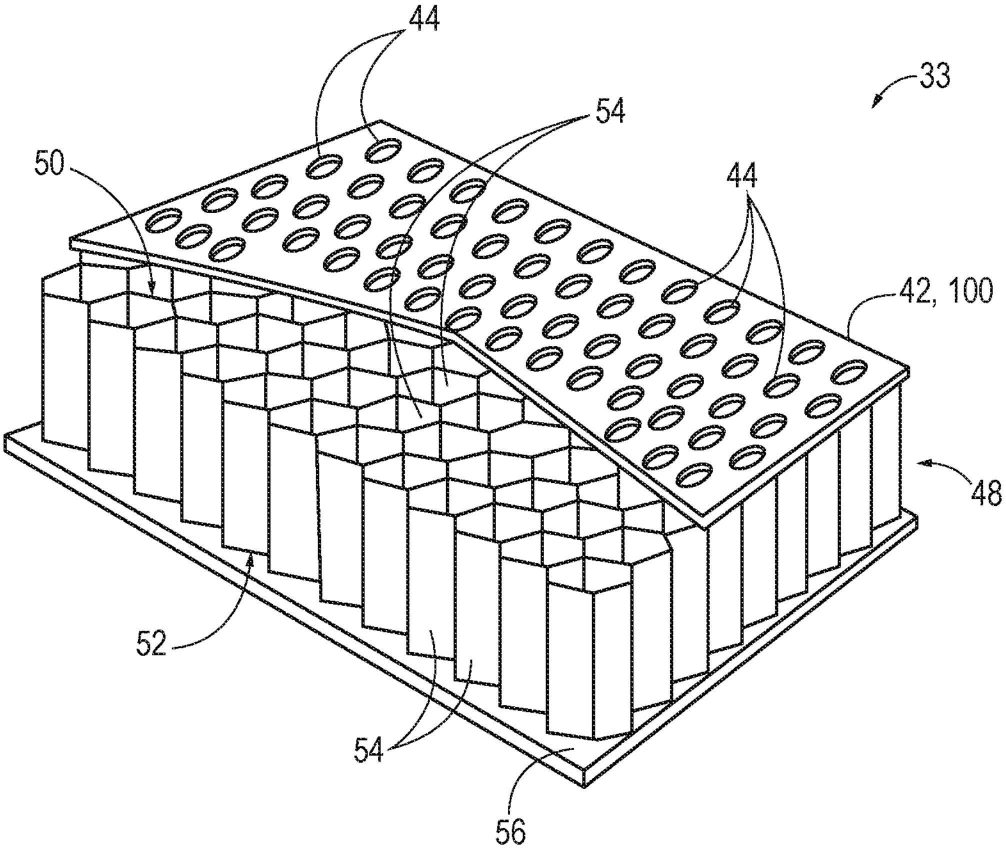
FIG. 4 is a perspective view of an example of an acoustic liner formed according to methods of the present disclosure.

Such systems 30 may be used to form any number of holes (including a single hole) in or through a variety of materials, though in some examples may be used to form acoustic liner 33, an example of which is shown in FIG. 4. Acoustic liner 33 includes a thin sheet material 42 (which is an example of workpiece 32 and perforated sheet 100) having a plurality of perforations 44 formed therethrough. Said perforations 44 are holes that extend through an entire thickness 46 (FIG. 3) of thin sheet material 42. In some specific examples, thickness 46 of thin sheet material 42 may be less than 0.25 inches, less than 0.1 inches, less than 0.05 inches, and/or less than 0.025 inches thick. Thin sheet material 42 generally is formed of composite material, though may be formed of other material, including metals and ceramics.

Acoustic liner 33 also includes a honeycomb structure 48 having a first side 50, a second side 52 opposite first side 50, and a plurality of internal partitions, or internal cells 54, extending between first side 50 and second side 52. First side 50 is coupled to thin sheet material 42, and second side 52 is coupled to a rigid backplate 56, such that honeycomb structure 48 is sandwiched between thin sheet material 42 and rigid backplate 56. Each internal cell 54 is sized to fit an acoustic plane wave in the internal cell 54 for a desired frequency range such that acoustic liner 33 is configured to produce noise attenuation properties for the desired frequency range. For example, internal cells 54 may be sized according to the particular application for which acoustic liner 33 is designed, with the size of internal cells 54 being selectively varied according to the expected frequencies of noise expected in a given use. In this manner, acoustic liner 33 may be used for reducing noise pollution and/or for noise attenuation in a variety of applications. In one specific example, acoustic liner 33 may be configured for use in a jet engine housing in an aircraft, with internal cells 54 being sized to accommodate the range of acoustic plane waves produced by the jet engine such that acoustic liner 33 may be used to reduce noise pollution from an engine and/or for noise attenuation in an aircraft or other apparatus. Jet engines including acoustic liner 33 and aircraft including acoustic liner 33 are within the scope of the present disclosure.

Thin sheet material 42 may be formed of, for example, a carbon-fiber or glass fiber reinforced polymer, a thermoplastic material, a thermoset material, carbon fiber or glass fiber reinforced polyether ether ketone (PEEK), carbon fiber or glass fiber reinforced polyphenylene sulfide (PPS), carbon fiber or glass fiber reinforced epoxy, and/or carbon fiber or glass fiber reinforced polyetherketoneketone (PEKK). Rigid backplate 56 (which may also be referred to as an impervious layer, a back-sheet, or a back-skin) may be formed of any material that provides sufficient support for thin sheet material 42 and honeycomb structure 48, with suitable examples including metal, carbon fiber, and/or a fiber-based reinforced polymer. Honeycomb structure 48 may be formed of Nomex® honeycomb material, though other honeycomb structure materials are also within the scope of the present disclosure.

Thin sheet material 42 may include any number of perforations 44. In some examples, thin sheet material 42 includes at least 100 perforations, at least 1,000 perforations, at least 10,000 perforations, at least 100,000 perforations, and/or at least 1,000,000 perforations formed in the thin sheet material. Perforations 44 are illustrated in FIG. 4 as being substantially oval-shaped, though perforations 44 may be a variety of different shapes. For example, perforations 44 may include round (e.g., circular) and/or non-circular perforations 44, such as square, rectangular, triangular, polygonal, star-shaped, and/or diamond-shaped, perforations 44. Different shaped perforations 44 may be created using needles 36 with various cross-sectional shapes and/or by lateral motion of needle array 60 and/or workpiece 32 during formation of perforations 44. In some examples of acoustic liner 33, perforations 44 may all be of a substantial uniform size and shape. In other examples of acoustic liner 33, one or more perforations 44 may be a different size and/or shape than one or more other of perforations 44. For example, one or more perforations 44 may be larger in a given area of workpiece 32 than one or more other perforations 44 in another area of workpiece 32. In some examples, different sizes and/or shapes of perforations 44 may be interspersed among each other, distributed across the surface of workpiece 32.

Presently disclosed systems 30 (and related methods of ultrasonic drilling using such systems 30) may be configured to form perforated sheets using techniques and materials that may reduce the time needed to form such perforations in acoustic liners 33, for example, by forming multiple holes at once. In addition, needles 36 for disclosed ultrasonic drilling techniques may be made from less expensive materials than conventional drill bits, and/or via less expensive design and manufacturing approaches (e.g., additive manufacturing) which may reduce the costs associated with manufacturing the tooling. Disclosed techniques also may increase the life cycle of the tooling, which may further decrease costs. For example, because disclosed systems and needle arrays are effectively pushing fibers aside to form the perforations rather than cutting through the material, such techniques may improve resulting material properties in the workpiece and/or decrease wear on the tooling. Disclosed techniques also may be less labor intensive than conventional drilling techniques, which may thereby reduce manufacturing flow time.

Figure 5:
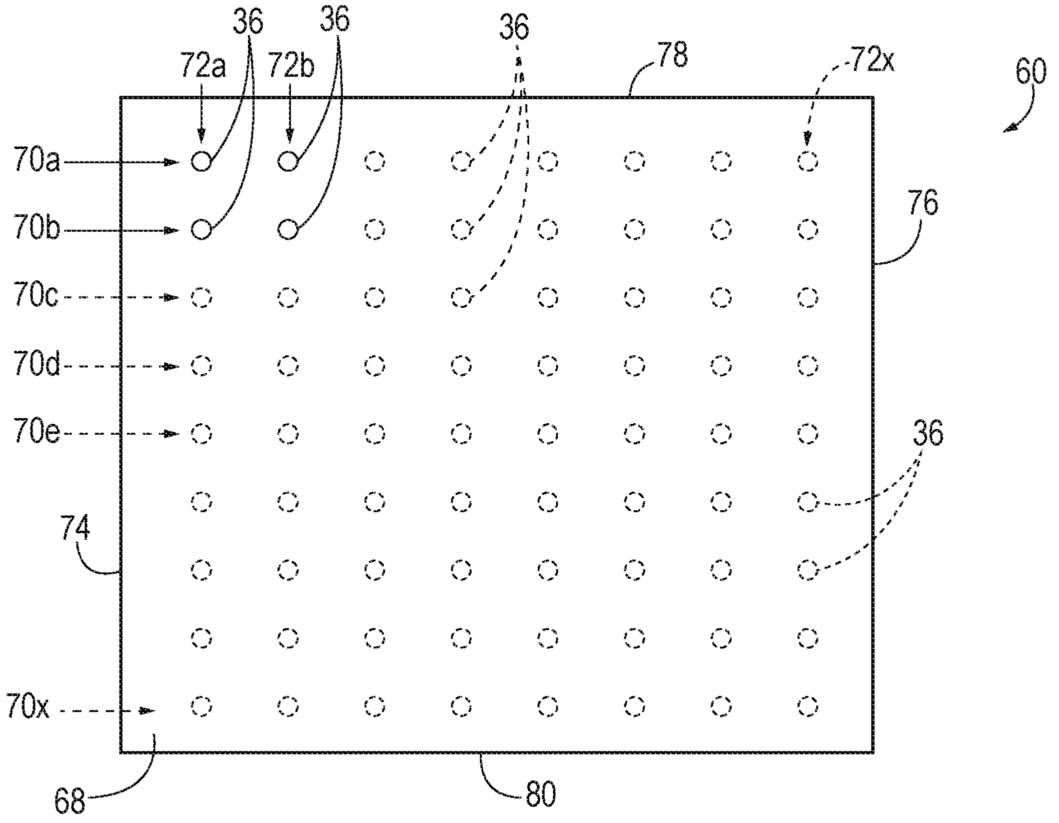
FIG. 5 is a schematic representation of examples of needle arrays according to the present disclosure, from a bottom plan view.

FIGS. 5-6 schematically illustrate examples of needle array 60 that may be used to form ultrasonic perforations in workpiece 32, according to the present disclosure. Needle array 60 includes a plurality of needles 36 arranged to form needle array 60. In an example, each needle 36 is oriented to extend along longitudinal axis 40 (FIG. 6) from a first end 62 to a second end 64. Each respective needle 36 is configured to form a respective hole, or perforation, in a workpiece when needle array 60 is vibrated along longitudinal axis 40 at an ultrasonic operating frequency while needle array 60 is positioned to repeatedly contact a surface of the workpiece (e.g., surface 34 of workpiece 32 shown in FIG. 3). For example, a needle array 60 having ten needles 36 is configured to form ten holes, or perforations, at a time within a region of a workpiece. Such holes are formed without translating needle array 60 with respect to the workpiece, without rotating the plurality of needles 36 about longitudinal axis 40, and without rotating the plurality of needles 36 with respect to the workpiece while the holes are being formed.

With reference again to FIG. 3, such perforations 44 may be within a region 66 of workpiece 32. To form perforations 44 in a different region of workpiece 32 (e.g., second region 98), workpiece 32 may be translated with respect to needle array 60, and/or needle array 60 may be translated with respect to workpiece 32 such that needle array 60 is positioned above the different region of workpiece 32 and the apparatus is operated again such that needles 36 repeatedly contact surface 34 of workpiece 32 in the different area, or region, thereby forming more perforations 44 in workpiece 32.

Perforations 44 are generally fairly small in size. For example, each perforation 44 may have diameter (or maximum dimension, in the case of non-round perforations 44) of less than 0.1 inches, less than 0.09 inches, less than 0.08 inches, less than 0.07 inches, less than 0.06 inches, less than 0.05 inches, less than 0.04 inches, less than 0.03 inches, less than 0.02 inches, and/or less than 0.01 inches. In a specific example, perforations 44 may have a diameter of between 0.04 inches and 0.05 inches. In some examples, each perforation 44 in a given workpiece 32 has a substantially uniform diameter. In some examples, a given workpiece 32 may include one or more perforations 44 that have a different size and/or shape than one or more other perforations 44 formed in workpiece 32. For example, a given needle array 60 may include a plurality of different sizes and/or shapes of needles 36 that form a plurality of different sizes and/or shapes of perforations 44 in a given region of workpiece 32. Additionally or alternatively, a first needle array 60 may be used to form perforations 44 of a first size and shape in one area of workpiece 32, while a second needle array 60 may be used to form perforations 44 of a different size and/or shape in a different area of workpiece 32.

In a given workpiece 32, each hole or perforation 44 may be spaced apart from each adjacent hole by a minimum center-to-center distance. In specific examples, the minimum center-to-center distance may be less than 0.5 inches, less than 0.4 inches, less than 0.3 inches, less than 0.2 inches, and/or less than 0.1 inches. In one specific example, the minimum center-to-center distance is between 0.13 inches and 0.15 inches. Additionally or alternatively, the minimum center-to-center distance may be larger than or equal to the diameter of each respective hole. For example, the minimum center-to-center distance may be at least 1.25 times the diameter of each respective hole, at least 1.5 times the diameter of each respective hole, at least 1.75 times the diameter of each respective hole, at least 2 times the diameter of each respective hole, at least 2.5 times the diameter of each respective hole, at least 3 times the diameter of each respective hole, at least 4 times the diameter of each respective hole, and/or at least 5 times the diameter of each respective hole.

With reference again to FIGS. 5-6, needle array 60 may include a support plate 68. In an example, each needle 36 is coupled to support plate 68 at its first end 62. In an example, each needle 36 may be integrally formed with support plate 68. Support plate 68 may serve as an interface between needles 36 and ultrasonic actuator 38 (FIG. 3) such that needle array 60 may be operatively coupled to ultrasonic actuator 38 to vibrate needle array 60 at a desired ultrasonic operating frequency, via support plate 68. In some examples, needle array 60 acts like a hone that amplifies ultrasonic vibrations from the ultrasonic actuator to increase mechanical energy output when needle array 60 is used to form perforations in a workpiece according to the present disclosure. In some examples, needle array is removably coupled to ultrasonic drilling apparatus 58 such that needle array may be selectively removed from ultrasonic actuator 38 and replaced with a different needle array 60.

Needle array 60 may include a variety of different numbers of needles, depending on the given application for needle array 60. For example, needle array 60 may include at least five needles 36, at least six needles 36, at least seven needles 36, at least eight needles 36, at least nine needles 36, at least ten needles 36, at least twenty needles 36, at least thirty needles 36, at least forty needles 36, at least fifty needles 36, at least sixty needles 36, at least seventy needles 36, at least eighty needles 36, at least ninety needles 36, and/or at least one hundred needles 36. Needles 36 of needle array 60 may be arranged in one or more rows 70 (e.g., row 70*a*, row 70*b*, etc.) of needles 36 and/or one or more columns 72 (e.g., column 72*a*, column 72*b*, etc.) of needles 36. Said columns 72 may be positioned between and substantially parallel to a first side 74 of support plate 68 and a second side 76 of support plate 68, and said rows 70 may be positioned between and substantially parallel to a third side 78 of support plate 68 and a fourth side 80 of support plate 68. Support plate 68 is illustrated as having a square-shaped footprint in FIG. 5, though support plate 68 may have any desired shape of footprint. Additionally or alternatively, needles 36 of needle array 60 may be arranged in a polar array (e.g., a circular arrangement), positioned randomly, and/or arranged in any desired shape or pattern.

In an example, needle array 60 includes a plurality of rows 70 of needles 36, each row 70 having a plurality of needles 36, and a plurality of columns 72, each column 72 having a plurality of needles 36. Needles 36 may be arranged in rows 70 and/or columns 72 according to length. For example, a first row 70*a* may include needles 36 having a first length and a second row 70*b* may include needles 36 having a second length. In some examples, the length of needles 36 may increase from row to row (e.g., from first row 70*a* to a last row 70*x*). In some examples, one or more respective rows 70 of needles 36 may include needles 36 of a different length than one or more other respective rows 70. In some examples, each respective row 70 may include needles 36 having a different respective length than each other respective row 70. In some examples, the needles 36 in a given row 70 all have a uniform length, whereas in other examples, one or more needles 36 in a given row 70 may have a different length than one or more other needles 36 in that row 70. Similarly, a first column 72*a* may include needles 36 having a first length and a second column 72*b* may include needles 36 having a second length. In some examples, the length of needles 36 may increase from column to column (e.g., from first column 72*a* to a last column 72*x*). In some examples, one or more respective column 72 of needles 36 may include needles 36 of a different length than one or more other respective column 72. In some examples, each respective column 72 may include needles 36 having a different respective length than each other respective column 72. In some examples, the needles 36 in a given column 72 all have a uniform length, whereas in other examples, one or more needles 36 in a given column 72 may have a different length than one or more other needles 36 in that column 72.

While FIG. 5 schematically represents needles 36 having a circular, or round, cross-sectional area, one or more needles 36 of needle array 60 may have a differently shaped cross-section. For example, one or more needles 36 of needle array 60 may have an oval, square, rectangular, triangular, polygonal, star-shaped, diamond-shaped, and/or other shape of cross-sectional area. Such differently shaped needles 36 may be amenable to presently disclosed ultrasonic techniques because needles 36 are not rotated during formation of the perforations. The cross-sectional area shapes of needles 36 may be selected or optimized to create correspondingly shaped perforations for improved noise attenuation performance in the resulting acoustic liners formed according to the present disclosure.

Needles 36 may be formed of any suitable materials, such as stainless steel, titanium, and/or other metals, as will be appreciated by one of ordinary skill in the art. Needles 36 may have a coating over some or all of the surface of needle 36, such as a tungsten carbide coating, though other coatings are also within the scope of the present disclosure. Second end 64 of some or all of needles 36 in needle array 60 may be beveled, shaped, coated, roughened, grooved, and/or otherwise shaped or treated, as will be appreciated by one of ordinary skill in the art. The radius and/or roughness of second end 64 of needle 36 may be selectively altered for desired properties of needle 36.

Figure 13:
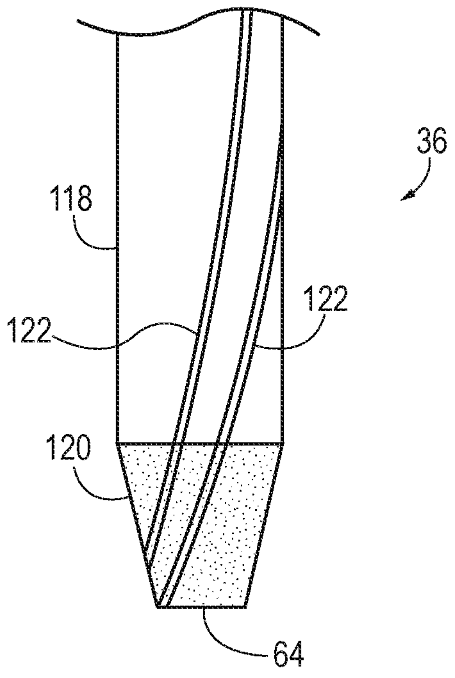
FIG. 13 is a schematic representation of an example of a needle tip for use with presently disclosed needle arrays and systems, illustrating a side elevation view of a portion of a needle.
Figure 14:
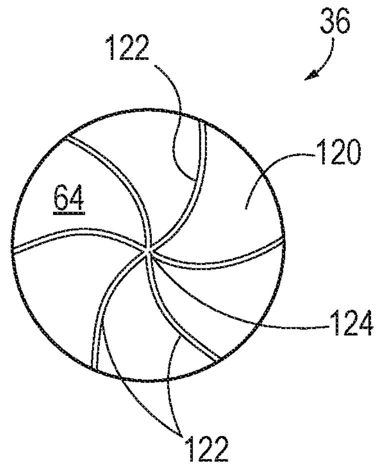
FIG. 14 is a schematic representation of an example of a needle tip for use with presently disclosed needle arrays and systems, illustrating a bottom plan view of the needle tip.

For example, FIG. 13 illustrates an example of needle 36 (which may be one of a plurality of needles 36 of needle array 60). As shown in FIG. 13, needle 36 may include a smooth shaft portion 118 and a textured, or roughened, tip portion 120 adjacent second end 64. Tip portion 120 may be conical in some examples. Needle 36 may include one or more grooves 122 formed in shaft portion 118 and/or in tip portion 120. For example, needle 36 as shown in FIG. 13 includes two grooves 122 than extend from shaft portion 118 and into tip portion 120. Other examples of needle 36 may include more or fewer grooves 122. One or more grooves 122 may be positioned just within shaft portion 118 in some examples, and/or one or more grooves 122 may be positioned just within tip portion 120. Said grooves 122 may be configured to allow removal of debris from the work area while perforations 44 are being formed in workpiece 32. FIG. 14 shows an example of needle 36 as seen from the bottom, at second end 64. As seen in FIG. 14, needle 36 includes a plurality of curved grooves 122 that meet at a central point 124 of tip portion 120, though other arrangements of grooves 122 are also within the scope of the present disclosure. In some examples, tip portion 120 may have a surface roughness of less than 20 grit, less than 40 grit, less than 60 grit, less than 80 grit, less than 100 grit, less than 120 grit, less than 140 grit, and/or less than 160 grit. In a specific example, tip portion 120 has a surface roughness of between 80-120 grit. In another example, tip portion 120 has a surface roughness of between 40-60 grit.

Figure 7:
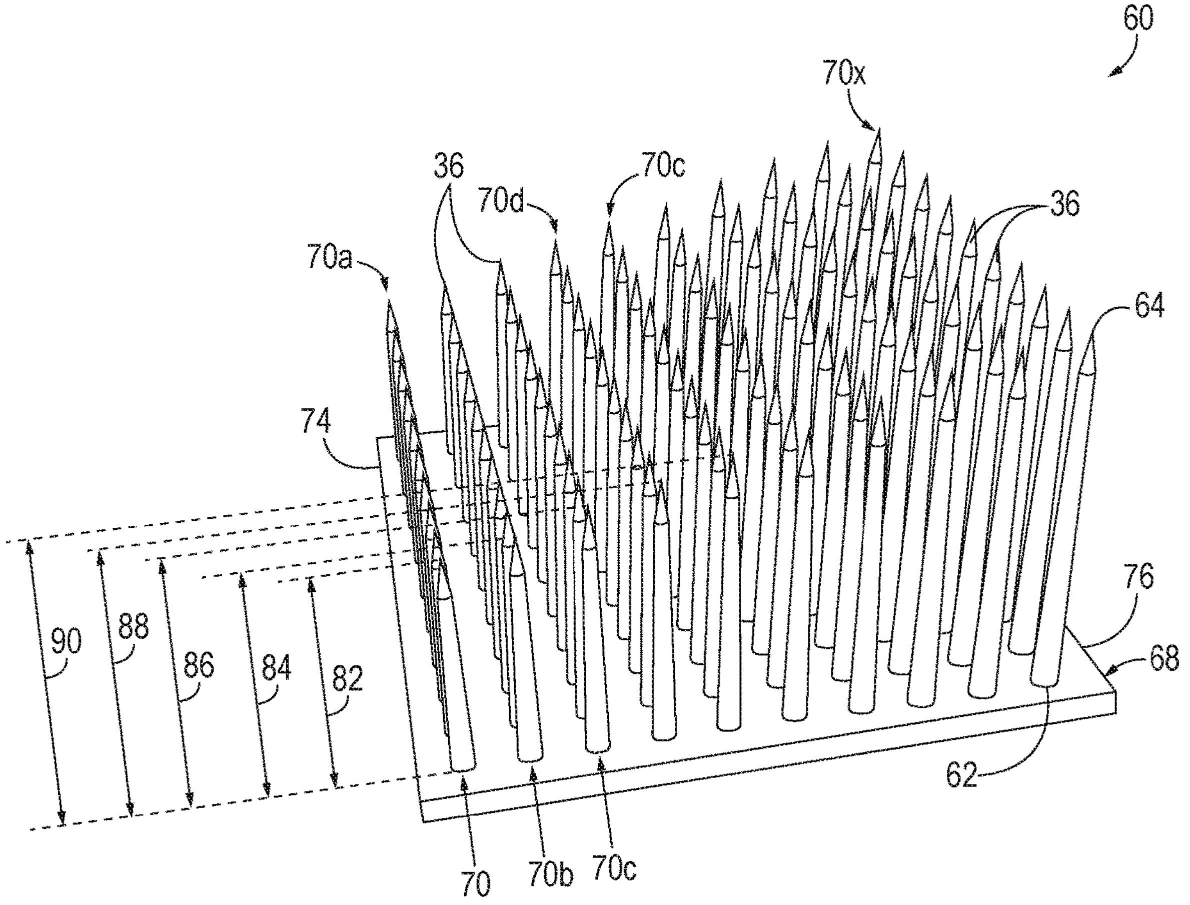
FIG. 7 is a perspective view of an example of a needle array that may be used in presently disclosed methods.

FIG. 7 illustrates one example of needle array 60. In this example of FIG. 7, needle array 60 includes first row 70*a* of needles 36 each having a first length 82, a second row 70*b* of needles 36 each having a second length 84, a third row 70*c* of needles 36 each having a third length 86, a fourth row 70*d* of needles 36 each having a fourth length 88, a fifth row 70*e* of needles 36 each having a fifth length 90, and so on. In this example, the length of needles 36 increases from row to row between first side 74 of support plate 68 and second side 76 of support plate 68, such that second length 84 is greater than first length 82, third length 86 is greater than second length 84, and so on, with the length of needles 36 in last row 70*x* adjacent second side 76 of support plate 68 being the longest, and the length of needles 36 in first row 70*a* being the shortest. In this example, the length of the needles in a given column 72 increases along the column between first side 74 and second side 76 of support plate 68. Other arrangements are also within the scope of the present disclosure.

Figure 8:
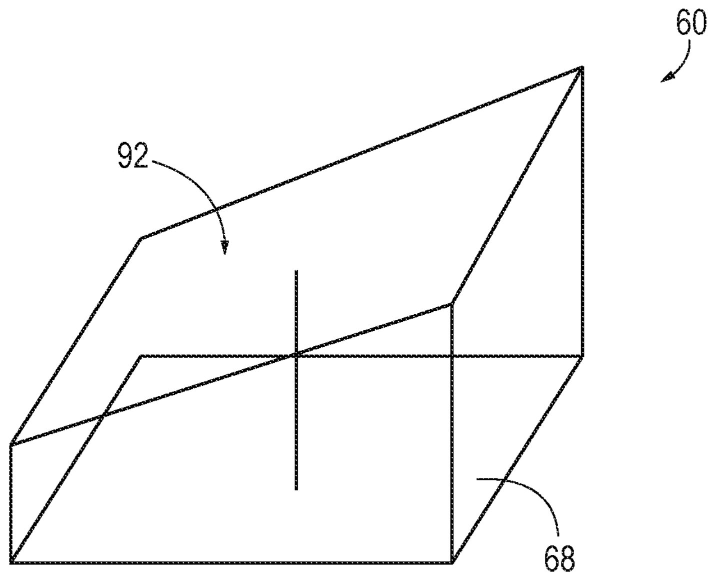
FIG. 8 is a schematic representation of an example of a distribution for needles in a needle array according to the present disclosure.
Figure 9:
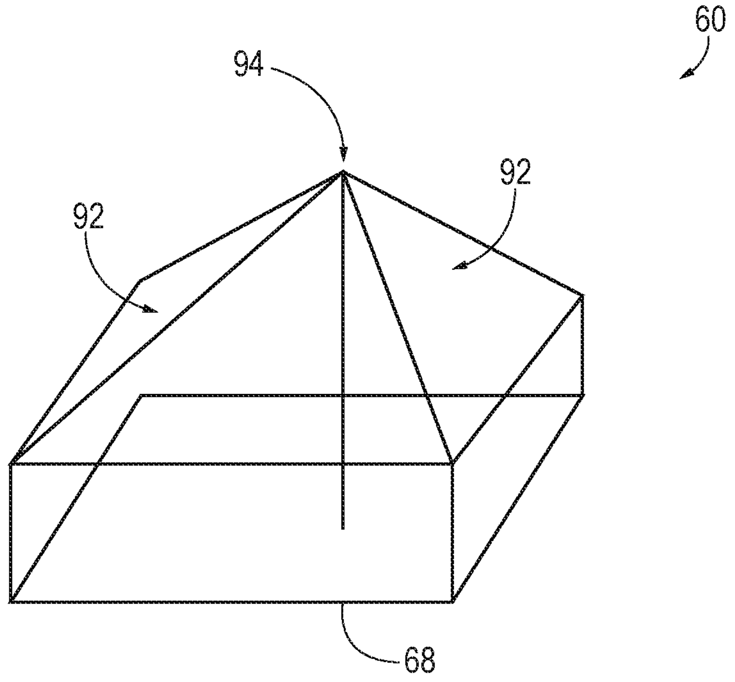
FIG. 9 is a schematic representation of another example of a distribution for needles in a needle array according to the present disclosure.

As schematically shown in FIGS. 8-9, second ends 64 of needles 36 in a given needle array 60 may collectively define a contact plane 92 or a plurality of contact planes 92 arranged with respect to one another to form a contact shape 94 (FIG. 9) or contact contour. For example, as shown in FIG. 8, needles 36 may be arranged in a bilinear distribution by their lengths, such that second ends 64 of needles 36 collectively form an angled contact plane 92 for contacting the workpiece. As another example, as shown in FIG. 9, needles 36 may be arranged in a pyramid distribution by their lengths, such that second ends 64 of needles 36 collectively form a pyramidal contact shape 94 for contacting the workpiece, with pyramidal contact shape 94 being defined by a plurality of contact planes 92 collectively defined by second ends 64 of needles 36. Other different arrangements of needles 36 may be formed to create different contact planes 92 and/or contact shapes 94. In some examples, needles 36 may be arranged to collectively define a contact contour having a curved or irregular shape. Additionally or alternatively, needles 36 may be selectively arranged by their lengths to optimize energy consumption by the ultrasonic actuator to which needle array 60 is operatively coupled. Additionally or alternatively, needles 36 of needle array 60 may be selectively arranged to maximize perforation efficiency.

With reference again to FIG. 3, systems 30 may include a remote heating unit 96 spaced apart from ultrasonic drilling apparatus 58. Additionally or alternatively, ultrasonic drilling apparatus 58 may include a heating unit coupled to ultrasonic drilling apparatus 58, and/or ultrasonic drilling apparatus 58 may effectively heat workpiece 32 by vibrating needle array 60 against workpiece 32 in the absence of a cooling fluid or coolant. Remote heating unit 96 is configured to locally heat a portion of workpiece 32 while perforations 44 are formed therein. For example, remote heating unit 96 may be positioned with respect to workpiece 32 and ultrasonic drilling apparatus 58 such that remote heating unit 96 locally heats a first region (e.g., region 66) of workpiece 32 while needle array 60 is positioned above first region 66 such that first region 66 is heated while ultrasonic drilling apparatus 58 contacts surface 34 to form perforations 44 within region 66. Remote heating unit 96 may be configured to maintain a temperature of a given region of the thin sheet material (e.g., first region 66 of workpiece 32) above a threshold temperature while perforations 44 are formed by ultrasonic drilling apparatus 58. For example, the threshold temperature may be a glass transition temperature of the resin used in the composite material from which workpiece 32 is formed. In specific examples, the threshold temperature may be at least 200 degrees Fahrenheit (° F.), at least 210° F., at least 220° F., at least 230° F., at least 240° F., at least 250° F., at least 260° F., at least 270° F., at least 280° F., at least 290° F., and/or at least 300° F. Remote heating unit 96 may be a heating lamp in some systems 30, though other types of heating units are also within the scope of the present disclosure.

Once perforations 44 are formed in first region 66 of workpiece 32, needle array 60 may be translated with respect to workpiece 32 such that needle array 60 is positioned above a different region (e.g., second region 98 of workpiece 32) such that ultrasonic drilling apparatus 58 may be used to form perforations 44 within one or more other regions of workpiece 32. Additionally or alternatively, workpiece 32 may be translated with respect to needle array 60 such that a different region of workpiece 32 is positioned under needle array 60 to form perforations in the different region of workpiece 32.

Ultrasonic actuator 38 may be configured to operate at any suitable ultrasonic operating frequency. In some examples, the operating frequency is at least 15 kilohertz (kHz), at least 20 kHz, and/or at least 25 kHz. Methods of performing ultrasonic drilling in a composite material, methods of forming a plurality of perforations in a thin sheet, and methods of forming an acoustic liner are disclosed in U.S. patent application Ser. No. 16/796,606, filed on Feb. 20, 2020, and titled METHODS OF ULTRASONIC DRILLING FOR FORMING PERFORATIONS IN COMPOSITE MATERIALS, the entire disclosure of which is hereby incorporated herein in its entirety, for all purposes.

Figure 11:
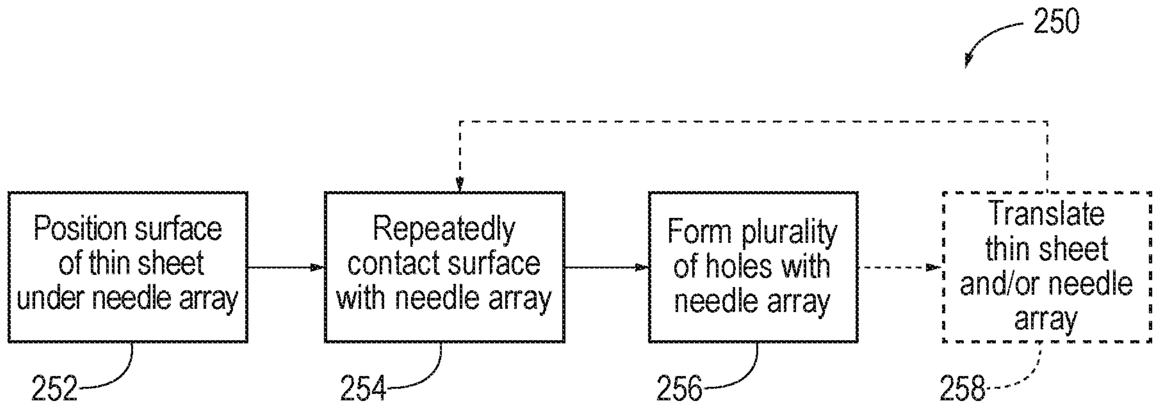
FIG. 11 is a flowchart diagram representing disclosed methods of forming one or more holes in a workpiece using a needle array.
Figure 12:
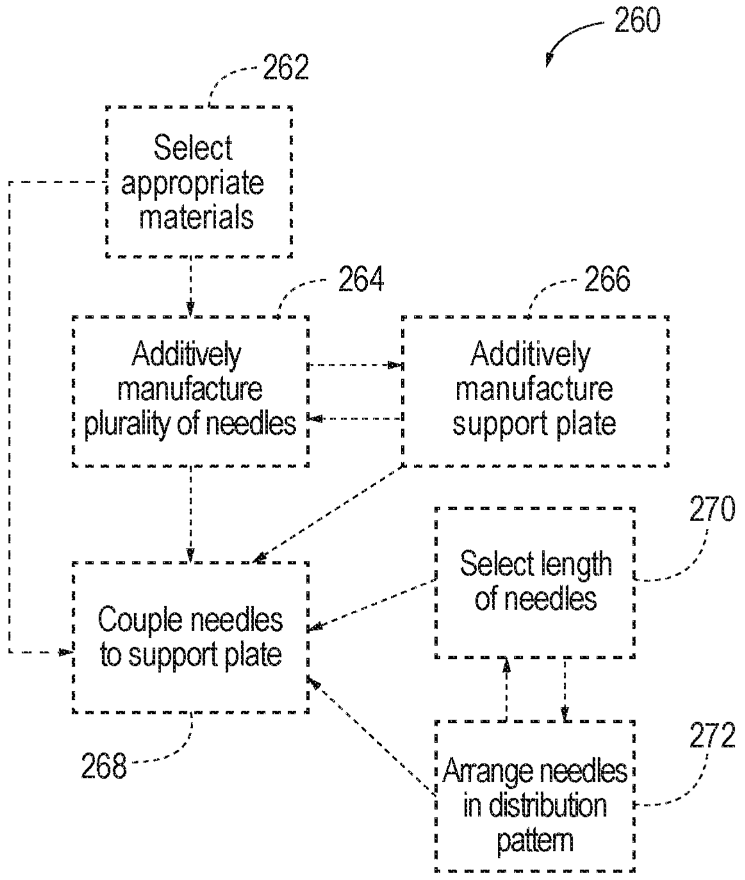
FIG. 12 is a flowchart diagram representing disclosed methods of forming a needle array according to the present disclosure.

FIGS. 11-12 schematically provide flowcharts that represent illustrative, non-exclusive examples of methods according to the present disclosure. In FIGS. 11-12, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 11-12 are not limiting and other methods and steps are within the scope of the present disclosure, including methods having greater than or fewer than the number of steps illustrated, as understood from the discussions herein.

FIG. 11 schematically illustrates methods 250 of forming a plurality of perforations (e.g., perforations 44) in a thin sheet of composite material (e.g., thin sheet material 42). Methods 250 include positioning a surface of the thin sheet with respect to a needle array (e.g., needle array 60), at 252, wherein the needle array is operatively coupled to an ultrasonic drilling apparatus, such that the needles of the needle array share a longitudinal axis that is substantially orthogonal to the surface of the thin sheet. Methods 250 also include forming the plurality of holes in the thin sheet at 256 by vibrating the needle array along the longitudinal axis such that the needle array repeatedly contacts the surface of the thin sheet at 254, at an operating frequency sufficient to form the plurality of holes in the thin sheet. The vibrating the needle array is performed for a time sufficient to form the plurality of holes in the thin sheet, while the needle array is not rotated with respect to the surface of the thin sheet during the forming the plurality of holes, and further, the forming the plurality of holes is performed at 256 without use of a slurry or a cooling fluid.

Figure 10:
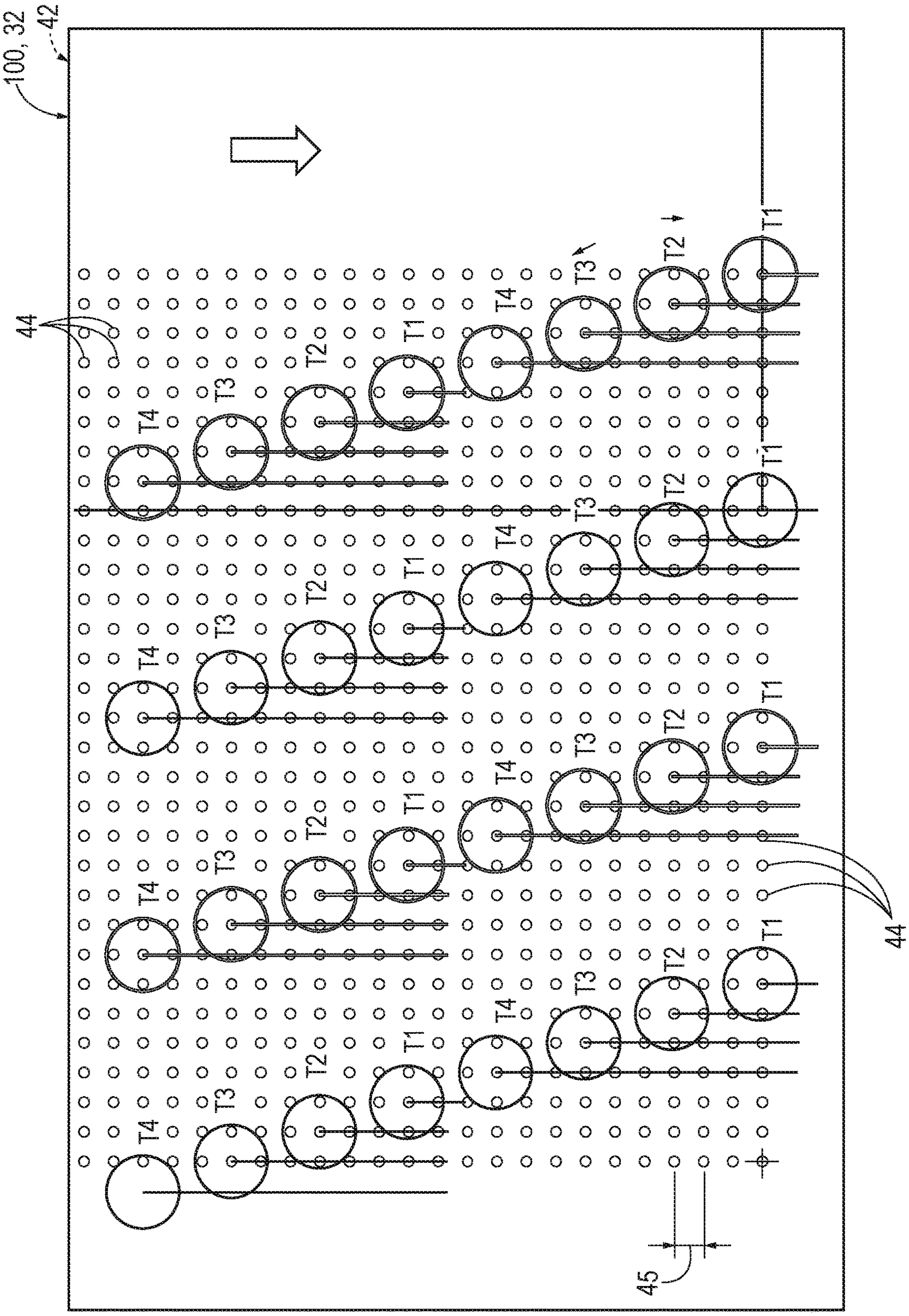
FIG. 10 is a top plan view of a workpiece with a plurality of holes formed therein according to disclosed methods.

Methods 250 also may include translating the thin sheet and/or the needle array at 258 such that the thin sheet is positioned with respect to the needle array such that the needle array is positioned above a second region of the thin sheet, and then again repeatedly contacting the surface of the thin sheet within the second region with the needle array at 254, at an operating frequency of above 20 kHz for a period of time sufficient to form a second plurality of holes in the second region of the thin sheet. Such translating at 258 and repeatedly contacting the surface at 254 may be repeated any number of times to form a plurality of holes at 256 in a plurality of different areas of the thin sheet of composite material, according to presently disclosed methods. FIG. 10 schematically illustrates an example of perforated sheet 100 with a plurality of perforations 44 formed therein, according to presently disclosed methods. As shown in FIG. 10, a head of an ultrasonic drilling apparatus may be moved in a predetermined pattern, at a predetermined speed to form a pattern of perforations 44 through the perforated sheet. The spacing of the needles of the needle array and the movement of the needle array with respect to the perforated sheet 100 may be configured to create a minimum center-to-center distance 45 between adjacent perforations 44.

FIG. 12 schematically illustrates methods 260 of making a needle array for forming ultrasonic perforations. In some examples, method 260 includes additively manufacturing (e.g., 3D printing, or electron-beam additive manufacturing, and/or selective laser sintering) a plurality of needles (e.g., needle 36) at 264 and/or additively manufacturing a support plate (e.g., support plate 68) at 266. Additively manufacturing the needles at 264 and additively manufacturing the support plate at 266 may be performed substantially continuously, such that the plurality of needles and the support plate are integrally formed. In other examples, a plurality of needles (which may be additively manufactured at 264 or otherwise manufactured) may be coupled to a support plate at 268 (with said support plate either being additively manufactured at 266 or otherwise manufactured). In examples of methods 260 where the entire needle array is additively manufactured, the first ends of the plurality of needles are integrally formed with the support plate, and the plurality of needles extend away from the support plate such that the tips of the plurality of needles are spaced apart from the support plate. In examples where needles are coupled to the support plate at 268, said coupling may be achieved by, for example, adhering the needles to the support plate, fastening the needles to the support plate, welding the needles to the support plate, inserting the needles into holes formed in the support plate (e.g., via an interference fit), and/or any other suitable means of coupling the needles to the support plate.

In some examples, methods 260 include selecting a respective length of each respective needle of the plurality of needles at 270 and arranging each respective needle with respect to one another in a desired distribution pattern at 272. For example, selecting the length of the needles at 270 includes selecting each respective length of each respective needle of the needle array to define a desired contact shape, contact contour, or contact plane collectively defined by the tips of the needles. Similarly, arranging the needles at 272 may be performed based on their respective lengths such that a desired contact plane or contact shape is collectively defined by the tips of the needles. For example, arranging the needles at 272 may include arranging each needle of the plurality of needles with respect to each other to form a bilinear distribution of lengths of the needles. Additionally or alternatively, arranging the needles at 272 may include arranging each needle of the plurality of needles with respect to each other to form a pyramidal distribution of lengths of the needles.

Some methods 260 include selecting materials for the needles of the needle array at 262, based on the material being contacted by the needle array. The needle array made according to methods 260 may be a two-dimensional or three-dimensional needle array.

Illustrative, non-exclusive examples of inventive subject matter according to the present disclosure are described in the following enumerated paragraphs:

A1. A needle array for forming ultrasonic perforations in a workpiece, the needle array comprising:

a plurality of needles arranged to form the needle array, wherein each needle of the plurality of needles is oriented to extend along a longitudinal axis from a first end to a tip, wherein each respective needle of the plurality of needles is configured to form a respective hole in the workpiece when the needle array is vibrated along the longitudinal axis at an ultrasonic operating frequency while the needle array is positioned to repeatedly contact a surface of the workpiece, wherein each needle of the plurality of needles has a non-circular cross-sectional area, wherein the needle array is configured to form a plurality of holes within a region of the workpiece without translating the needle array with respect to the workpiece, without rotating the plurality of needles about the longitudinal axis, and without rotating the plurality of needles with respect to the workpiece, and wherein the needle array is configured to be operatively coupled to an ultrasonic actuator to vibrate the needle array at the ultrasonic operating frequency.

A1.1. The needle array of paragraph A1, further comprising a support plate, wherein each respective needle of the plurality of needles is coupled to the support plate at its respective first end, and wherein the needle array is configured to be operatively coupled to the ultrasonic actuator to vibrate the needle array at the ultrasonic operating frequency, via the support plate.

A2. The needle array of paragraph A1 or A1.1, wherein the needle array comprises at least five needles, at least six needles, at least seven needles, at least eight needles, at least nine needles, at least ten needles, at least twenty needles, at least thirty needles, at least forty needles, at least fifty needles, at least sixty needles, at least seventy needles, at least eighty needles, at least ninety needles, and/or at least one hundred needles.

A3. The needle array of any of paragraphs A1-A2, wherein the needle array comprises:

a plurality of rows of needles, each row of the plurality of rows comprising a plurality of needles; and a plurality of columns of needles, each column of the plurality of columns comprising a plurality of needles.

A4. The needle array of paragraph A3, wherein a first row of the plurality of rows of needles is formed of needles having a first length.

A5. The needle array of any of paragraphs A3-A4, wherein a second row of the plurality of rows of needles is formed of needles having a second length.

A6. The needle array of any of paragraphs A3-A5, wherein each respective row of the plurality of rows of needles is formed of needles having a different respective length.

A7. The needle array of any of paragraphs A3-A6, wherein the plurality of rows of needles comprises:

(i) a/the first row of needles each having a/the first length;

(ii) a/the second row of needles each having a/the second length that is greater than the first length;

(iii) a third row of needles each having a third length that is greater than the second length;

(iv) a fourth row of needles each having a fourth length that is greater than the third length; and (v) a fifth row of needles each having a fifth length that is greater than the fourth length.

A8. The needle array of paragraph A7, further comprising an additional plurality of rows of needles, wherein each respective additional row of the additional plurality of rows of needles is formed of needles having a respective length that is greater than at least one other respective row of needles.

A9. The needle array of paragraphs A7 or A8, wherein the plurality of rows of needles comprises a last row of needles having a last length.

A10. The needle array of any of paragraphs A3-A9, wherein the plurality of rows of needles comprises:

(i) a/the first row of needles each having a/the first length;

(ii) a plurality of intervening rows of needles; and (iii) a/the last row of needles each having a/the last length.

A11. The needle array of paragraph A10, wherein the first length is different from the last length.

A12. The needle array of any of paragraphs A10-A11, wherein each row of the plurality of intervening rows is formed of respective needles having a different respective length, wherein each respective length of each respective intervening row of the plurality of intervening rows is different from the first length and the last length.

A13. The needle array of any of paragraphs A10-A12, wherein the first row of needles is positioned near a first side of the needle array and/or a first side of a/the support plate, and wherein the last row of needles is positioned near a second side of the needle array and/or near a second side of the support plate, wherein the second side of the needle array is opposite the first side of the needle array and/or wherein the second side of the support plate is opposite the first side of the support plate.

A14. The needle array of paragraph A13, wherein the plurality of intervening rows is positioned between the first row of needles and the last row of needles.

A15. The needle array of paragraph A14, wherein each respective intervening row of the plurality of intervening rows is arranged such that a respective length of respective needles forming the respective intervening row is greater than a first adjacent respective length of respective needles forming a first adjacent intervening row, and such that the respective length of respective needles forming the respective intervening row is less than a second adjacent respective length of respective needles forming a second adjacent intervening row.

A16. The needle array of paragraph A14, wherein the plurality of intervening rows is arranged sequentially in order of increasing length of respective needles forming each respective intervening row.

A17. The needle array of any of paragraphs A1-A16, wherein the needle array comprises a polar array of needles.

A18. The needle array of any of paragraphs A1-A17, wherein each respective needle of the plurality of needles each extends longitudinally from a respective first end to a respective second end.

A19. The needle array of paragraph A18, wherein the first ends of the plurality of needles are all coupled to a/the support plate.

A20. The needle array of any of paragraphs A18-A19, wherein the second ends of the plurality of needles collectively define a contact plane, a plurality of contact planes arranged with respect to one another to form a contact shape, or a contact contour.

A21. The needle array of any of paragraphs A1-A20, wherein the needles of the plurality of needles are arranged in a bilinear distribution by their lengths, such that the second ends of the plurality of needles collectively form an angled contact plane for contacting the workpiece.

A22. The needle array of any of paragraphs A1-A20, wherein the needles of the plurality of needles are arranged in a pyramid distribution by their lengths, such that the second ends of the plurality of needles collectively form a/the contact shape for contacting the workpiece, wherein the contact shape is pyramidal.

A23. The needle array of any of paragraphs A1-A22, wherein the needles of the plurality of needles are selectively arranged by their lengths to optimize energy consumption by the ultrasonic actuator.

A24. The needle array of any of paragraphs A1-A23, wherein the needles of the plurality of needles are selectively arranged to maximize perforation efficiency.

A25. The needle array of any of paragraphs A1-A24, wherein the needle array is formed of steel and/or tungsten carbide.

A26. The needle array of any of paragraphs A1-A25, wherein the needle array is configured to act like a hone that amplifies ultrasonic vibrations from the ultrasonic actuator to increase mechanical energy output.

A27. The needle array of any of paragraphs A1-A26, wherein the needle array is a monolithic body.

A28. The needle array of any of paragraphs A1-A26, wherein the needle array comprises a plurality of needles individually coupled to a/the support plate to form the needle array.

A29. The needle array of any of paragraphs A1-A28, wherein each needle of the needle array has an oval, square, rectangular, triangular, polygonal, star-shaped, and/or diamond-shaped cross-sectional area.

B1. A method of making a needle array for forming ultrasonic perforations, the method comprising:

additively manufacturing a plurality of needles, wherein each respective needle of the plurality of needles extends longitudinally from a respective first end to a respective tip, wherein the plurality of needles are configured to repeatedly contact a workpiece at an ultrasonic operating frequency such that each respective needle of the needle array forms a respective hole through the workpiece; and additively manufacturing a support plate configured to secure a respective position of each respective needle with respect to the other needles of the plurality of needles such that the plurality of needles defines the needle array, wherein the first ends of the plurality of needles are integrally formed with the support plate, wherein the plurality of needles extend away from the support plate such that the tips of the plurality of needles are spaced apart from the support plate, wherein the support plate is integrally formed with the plurality of needles.

B1.1. The method of paragraph B1, wherein the additively manufacturing the plurality of needles and the additively manufacturing the support plate comprise 3D printing.

B1.2. The method of paragraph B1 or B1.1, wherein the additively manufacturing the plurality of needles and the additively manufacturing the support plate comprise selective laser sintering.

B1.3. The method of any of paragraphs B1-B1.2, wherein the additively manufacturing the plurality of needles and the additively manufacturing the support complete comprise electron-beam additive manufacturing.

B2. A method of making a needle array for forming ultrasonic perforations, the method comprising:

coupling a plurality of needles to a support plate, wherein each respective needle of the plurality of needles extends longitudinally from a respective first end to a respective tip, wherein the plurality of needles are configured to repeatedly contact a workpiece at an ultrasonic operating frequency such that each respective needle of the needle array forms a respective hole through the workpiece, wherein the support plate is configured to couple the plurality of needles together, wherein the support plate is further configured to secure a respective position of each respective needle with respect to the other needles of the plurality of needles such that the plurality of needles defines the needle array, wherein the first ends of the plurality of needles are coupled to the support plate in the coupling the plurality of needles, and wherein the plurality of needles extend away from the support plate such that the tips of the plurality of needles are spaced apart from the support plate;

selecting a respective length of each respective needle of the plurality of needles; and arranging each respective needle with respect to one another in a desired distribution pattern, based on their respective lengths, to form the needle array.

B3. The method of any of paragraphs B1-B2, wherein the needle array is the needle array of any of paragraphs A1-A29.

B4. The method of any of paragraphs B1-B3, further comprising selecting materials for the needles of the needle array based on the material being contacted by the needle array.

B5. The method of any of paragraphs B1-B4, further comprising selecting each respective length of each respective needle of the needle array to define a desired contact shape, contact contour, or contact plane collectively defined by the tips of the needles.

B6. The method of any of paragraphs B1-B5, further comprising arranging each needle of the plurality of needles with respect to each other to form a bilinear distribution of lengths of the needles.

B7. The method of any of paragraphs B1-B6, further comprising arranging each needle of the plurality of needles with respect to each other to form a pyramid distribution of lengths of the needles.

B8. The method of any of paragraphs B1-B7, wherein the needle array is a two-dimensional needle array.

B9. The method of any of paragraphs B1-B7, wherein the needle array is a three-dimensional needle array.

C1. A method of forming a plurality of perforations in a thin sheet of a composite material, the method comprising:

positioning a surface of the thin sheet with respect to the needle array of any of paragraphs A1-A29, wherein the needle array is operatively coupled to an ultrasonic drilling apparatus, wherein the needles of the needle array share a longitudinal axis that is substantially orthogonal to the surface of the thin sheet; and forming the plurality of holes in the thin sheet by vibrating the needle array along the longitudinal axis such that the needle array repeatedly contacts the surface of the thin sheet at an operating frequency sufficient to form the plurality of holes in the thin sheet, wherein the vibrating the needle array is performed for a time sufficient to form the plurality of holes in the thin sheet, wherein the needle array is not rotated with respect to the surface of the thin sheet during the forming the plurality of holes, and wherein the forming the plurality of holes is performed without use of a slurry or a cooling fluid.

C2. A method of forming a plurality of perforations in a thin sheet of a composite material, the method comprising:

positioning a surface of the thin sheet with respect to the needle array of any of paragraphs A1-A29, wherein the needle array is operatively coupled to an ultrasonic drilling apparatus such that the needle array is positioned above a first region of the thin sheet, wherein the needle array comprises a plurality of needles extending along a longitudinal axis that is substantially orthogonal to the surface of the thin sheet;

repeatedly contacting the surface of the thin sheet within the first region with the needle array at an operating frequency of above 20 kHz for a period of time sufficient to form a first plurality of holes in the first region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the needles with respect to the thin sheet, and without use of a slurry or a cooling fluid;

translating the thin sheet and/or the needle array such that the thin sheet is positioned with respect to the needle array such that the needle array is positioned above a second region of the thin sheet; and repeatedly contacting the surface of the thin sheet within the second region with the needle array at an operating frequency of above 20 kHz for a period of time sufficient to form a second plurality of holes in the second region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of a slurry or a cooling fluid.

D1. A system for forming perforations in a thin sheet of composite material, the system comprising:
   an ultrasonic drilling apparatus comprising:
      the needle array of any of paragraphs A1-A29; and
      an ultrasonic actuator configured to vibrate the needle array along a longitudinal axis such that the needle array repeatedly contacts a surface of the thin sheet at an operating frequency sufficient to form a plurality of holes through the thin sheet within a first region of the thin sheet, wherein the needle array does not rotate with respect to the surface of the thin sheet while the plurality of holes is formed, and wherein the ultrasonic drilling apparatus is configured to operate without use of a slurry or a cooling fluid; and
   a remote heating unit spaced apart from the ultrasonic drilling apparatus, wherein the remote heating unit is configured to locally heat the first region of the thin sheet while the plurality of holes is formed by the ultrasonic drilling apparatus.

D2. The system of paragraph D1, wherein the operating frequency is at least 15 kHz, at least 20 kHz, and/or at least 25 kHz.

D3. The system of any of paragraphs D1-D2, wherein the needle array is removably coupled to the ultrasonic drilling apparatus.

D4. The system of any of paragraphs D1-D3, wherein the needle array is configured to be translated with respect to the thin sheet to form a second plurality of holes through the thin sheet within a second region of the thin sheet.

D5. The system of any of paragraphs D1-D4, wherein the remote heating unit is configured to maintain a temperature of the first region of the thin sheet above a threshold temperature while the plurality of holes is formed by the ultrasonic drilling apparatus.

D6. The system of paragraph D5, wherein the threshold temperature is a glass transition temperature of a resin of the composite material.

D7. The system of any of paragraphs D5-D6, wherein the threshold temperature is at least 200 Fahrenheit (° F.), at least 210° F., at least 220° F., at least 230° F., at least 240° F., at least 250° F., at least 260° F., at least 270° F., at least 280° F., at least 290° F., and/or at least 300° F.

D8. The system of any of paragraphs D1-D7, wherein the remote heating unit comprises a heating lamp.

E1. The use of the needle array of any of paragraphs A1-A29 for forming perforations in a thin sheet of composite material.

E2. The use of the system of any of paragraphs D1-D8 for forming perforations in a thin sheet of composite material.

E3. The use of the system of any of paragraphs D1-D8 for forming an acoustic liner for reducing noise pollution and/or for noise attenuation.

E4. The use of the system of any of paragraphs D1-D8 for forming an acoustic liner for reducing noise pollution from an engine and/or for noise attenuation in an aircraft.

E5. The use of the needle array of any of paragraphs A1-A29 for forming an acoustic liner for reducing noise pollution and/or for noise attenuation.

E6. The use of the needle array of any of paragraphs A1-A29 for forming an acoustic liner for reducing noise pollution from an engine and/or for noise attenuation in an aircraft.

As used herein, the terms “selective” and “selectively,” when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms “adapted” and “configured” mean that the element, component, or other subject matter is designed and/or intended to perform a given function. Thus, the use of the terms “adapted” and “configured” should not be construed to mean that a given element, component, or other subject matter is simply “capable of” performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase “at least one,” in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase “at least one” refers, whether related or unrelated to those entities specifically identified. Thus, as a non-limiting example, “at least one of A and B” (or, equivalently, “at least one of A or B,” or, equivalently “at least one of A and/or B”) may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases “at least one,” “one or more,” and “and/or” are open-ended expressions that are both conjunctive and disjunctive in operation. For example, each of the expressions “at least one of A, B, and C,” “at least one of A, B, or C,” “one or more of A, B, and C,” “one or more of A, B, or C,” and “A, B, and/or C” may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A needle array for forming ultrasonic perforations in a workpiece, the needle array comprising:

a plurality of needles arranged to form the needle array, wherein each needle of the plurality of needles is oriented to extend along a longitudinal axis from a first end to a second end, wherein each respective needle of the plurality of needles is configured to form a respective hole in the workpiece when the needle array is vibrated along the longitudinal axis at an ultrasonic operating frequency while the needle array is positioned to repeatedly contact a surface of the workpiece, wherein each needle of the plurality of needles has a non-circular cross-sectional area, wherein the needle array is configured to form a plurality of holes within a region of the workpiece without translating the needle array with respect to the workpiece, without rotating the plurality of needles about the longitudinal axis, and without rotating the plurality of needles with respect to the workpiece; and a support plate, wherein the first end of each respective needle of the plurality of needles is coupled to the support plate, and wherein the needle array is configured to be operatively coupled to an ultrasonic actuator, via the support plate, to vibrate the needle array at the ultrasonic operating frequency;

wherein the plurality of needles are arranged in a distribution selected from the group consisting of a bilinear distribution and a pyramid distribution, wherein in the bilinear distribution, the needles of the plurality of needles are arranged according to their lengths such that the second end of each needle of the plurality of needles collectively form an angled contact plane for contacting the workpiece, and wherein in the pyramid distribution, the needles of the plurality of needles are arranged such that the second end of each needle of the plurality of needles collectively form a pyramidal contact shape for contacting the workpiece.

2. The needle array according to claim 1, wherein the needle array comprises at least nine needles.

3. A needle array for forming ultrasonic perforations in a workpiece, the needle array comprising:

a plurality of needles arranged to form the needle array, wherein each needle of the plurality of needles is oriented to extend along a longitudinal axis from a first end to a second end, wherein each respective needle of the plurality of needles is configured to form a respective hole in the workpiece when the needle array is vibrated along the longitudinal axis at an ultrasonic operating frequency while the needle array is positioned to repeatedly contact a surface of the workpiece, wherein each needle of the plurality of needles has a non-circular cross-sectional area, wherein the needle array is configured to form a plurality of holes within a region of the workpiece without translating the needle array with respect to the workpiece, without rotating the plurality of needles about the longitudinal axis, and without rotating the plurality of needles with respect to the workpiece, wherein the needle array comprises a two-dimensional array that comprises:

a plurality of rows of needles, each row of the plurality of rows of needles comprising a plurality of needles, wherein the plurality of rows of needles is selectively arranged sequentially in order of increasing length of respective needles forming each respective row of needles; and a plurality of columns of needles, each column of the plurality of columns of needles comprising a plurality of needles; and a support plate, wherein each respective needle of the plurality of needles is coupled to the support plate at the first end of each respective needle, and wherein the needle array is configured to be operatively coupled to an ultrasonic actuator, via the support plate, to vibrate the needle array at the ultrasonic operating frequency.

4. The needle array according to claim 1, wherein each needle of the plurality of needles has a polygonal cross-sectional area.

5. The needle array according to claim 1, wherein the needle array comprises a three-dimensional array.

6. The needle array according to claim 1, wherein the second ends of the plurality of needles collectively define a contact plane, a plurality of contact planes arranged with respect to one another to form a contact shape, or a contact contour.

7. The needle array according to claim 1, wherein the needle array is a monolithic body.

8. A method of making a needle array for forming ultrasonic perforations, the method comprising:

additively manufacturing a plurality of needles via 3D printing, wherein the plurality of needles is arranged to form the needle array according to claim 1, wherein each respective needle of the plurality of needles extends longitudinally from a respective first end to a respective second end forming a tip, wherein the plurality of needles is configured to repeatedly contact the workpiece at the ultrasonic operating frequency such that each respective needle of the needle array forms the respective hole through the workpiece; and additively manufacturing the support plate configured to secure a respective position of each respective needle with respect to each other needle of the plurality of needles such that the plurality of needles defines the needle array, wherein the first ends of the plurality of needles are integrally formed with the support plate, wherein the plurality of needles extend away from the support plate such that the tips of the plurality of needles are spaced apart from the support plate, and wherein the support plate is integrally formed with the plurality of needles.

9. A method of making a needle array for forming ultrasonic perforations, the method comprising:

coupling a plurality of needles to a support plate, wherein the plurality of needles is arranged to form the needle array according to claim 1, wherein each respective needle of the plurality of needles extends longitudinally from a respective first end to a respective second end forming a tip, wherein the plurality of needles are configured to repeatedly contact the workpiece at the ultrasonic operating frequency such that each respective needle of the needle array forms the respective hole through the workpiece, wherein the support plate is configured to couple the plurality of needles together, wherein the support plate is further configured to secure a respective position of each respective needle with respect to each other needle of the plurality of needles such that the plurality of needles defines the needle array, wherein the first ends of the plurality of needles are coupled to the support plate in the coupling the plurality of needles, and wherein the plurality of needles extend away from the support plate such that the tips of the plurality of needles are spaced apart from the support plate;

selecting a respective length of each respective needle of the plurality of needles to define a desired contact shape, contact contour, or contact plane collectively defined by the tips of the needles; and arranging each respective needle with respect to one another in a desired distribution pattern based on the respective lengths to form the needle array, wherein the desired distribution pattern is selected from the group consisting of the bilinear distribution and the pyramid distribution.

10. A method of forming a plurality of perforations in a thin sheet of a composite material, the method comprising:

positioning a surface of the thin sheet with respect to the needle array according to claim 1, wherein the needle array is operatively coupled to an ultrasonic drilling apparatus such that the needle array is positioned above a first region of the thin sheet, repeatedly contacting the surface of the thin sheet within the first region with the needle array at an operating frequency of above 20 kHz for a period of time sufficient to form a first plurality of holes in the first region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of a slurry or a cooling fluid;

translating the needle array such that the needle array is positioned above a second region of the thin sheet; and repeatedly contacting the surface of the thin sheet within the second region with the needle array at an operating frequency of above 20 kHz for a period of time sufficient to form a second plurality of holes in the second region of the thin sheet, wherein the repeatedly contacting the surface of the thin sheet forms a respective hole in the thin sheet corresponding to each respective needle of the needle array, wherein the repeatedly contacting the surface of the thin sheet comprises contacting the thin sheet with the plurality of needles of the needle array without rotating the plurality of needles about the longitudinal axis, without rotating the plurality of needles with respect to the thin sheet, and without use of the slurry or the cooling fluid.

11. A system for forming perforations in a thin sheet of a composite material, the system comprising:

an ultrasonic drilling apparatus comprising:

the needle array according to claim 1; and the ultrasonic actuator configured to vibrate the needle array along the longitudinal axis, such that the needle array repeatedly contacts a surface of the thin sheet at an operating frequency sufficient to form a plurality of holes through the thin sheet within a first region of the thin sheet, wherein the needle array does not rotate with respect to the surface of the thin sheet while the plurality of holes is formed, and wherein the ultrasonic drilling apparatus is configured to operate without use of a slurry or a cooling fluid; and a remote heating unit spaced apart from the ultrasonic drilling apparatus, wherein the remote heating unit is configured to locally heat the first region of the thin sheet while the plurality of holes is formed by the ultrasonic drilling apparatus.

12. The system according to claim 11, wherein the operating frequency is at least 20 kHz.

13. The system according to claim 11, wherein the needle array is removably coupled to the ultrasonic drilling apparatus.

14. The system according to claim 11, wherein the needle array is configured to be translated with respect to the thin sheet to form a second plurality of holes through the thin sheet within a second region of the thin sheet.

15. The system according to claim 11, wherein the remote heating unit is configured to maintain a temperature of the first region of the thin sheet above a threshold temperature while the plurality of holes is formed by the ultrasonic drilling apparatus, wherein the threshold temperature is a glass transition temperature of a resin of the composite material.

16. The needle array according to claim 1, wherein the second end of each respective needle of the plurality of needles is grooved.

17. The needle array according to claim 1, wherein the second end of each respective needle of the plurality of needles is roughened.

18. The needle array according to claim 1, wherein the second end of each respective needle of the plurality of needles is beveled.

19. The needle array according to claim 3, wherein the second end of each respective needle of the plurality of needles is grooved.

20. The needle array according to claim 3, wherein the second end of each respective needle of the plurality of needles is roughened.

* * * * *